3,538,147
BUTENE POLYCARBOXYLIC ACID
AND ITS ESTERS
Ken-Ichi Morita and Tsuneo Kobayashi, Kamakura-shi, Japan, assignors to Toyo Rayon Kabushiki Kaisha, Tokyo, Japan, a corporation of Japan
No Drawing. Filed Mar. 31, 1967, Ser. No. 627,289
Claims priority, application Japan, Apr. 6, 1966, 41/21,165, 41/21,166; May 4, 1966, 41/27,925, 41/27,926
Int. Cl. C07c 57/00, 69/52
U.S. Cl. 260—485     13 Claims

ABSTRACT OF THE DISCLOSURE

Butene polycarboxylic acid esters have been prepared by a reaction of acrylonitrile, an acrylic acid ester, acrolein, a vinyl ketone or a N,N-disubstituted acrylic amide with a maleic or fumaric acid ester. Suitable catalysts are organic tertiary phosphorus (III) compounds such as tricyclohexylphosphine, tris(di-n-butylamino)phosphine and tris(di-isobutylamino)phosphine. The reaction temperature may range from 0 to 200° C. Reflux in an appropriate inert solvent is advantageous. The ester can be converted to free butene-1,2,3-tricarboxylic acid or acid anhydride by known methods. The novel esters and free acid are useful especially as comonomers.

---

It has been found that novel butene polycarboxylic acid esters can be manufactured by reacting an acrylic compound selected from the group consisting of acrylonitrile, acrylic acid esters, acrolein, vinyl ketones and N,N-disubstituted acrylic amides with at least one ethylene dicarboxylic acid ester selected from the group consisting of maleic acid esters and fumaric acid esters in the presence of an organic tertiary phosphorus (III) compound selected from the group consisting of tertiary phosphines and teritary phosphoamides.

Most of the butene polycarboxylic acid esters obtained by the method of this invention can be expressed by the formula:

$$\begin{array}{l}CH_2{=}C{-}X\\ \phantom{CH_2{=}}CH{-}COOR'\\ \phantom{CH_2{=}}CH_2{-}COOR''\end{array} \quad (I)$$

It has been confirmed by the measurement of nuclear magnetic resonance that the reaction product sometimes contains some amount of 2-butene polycarboxylic acid ester of the formula:

$$\begin{array}{l}CH_3{-}C{-}X\\ \phantom{CH_3{-}}C{-}COOR'\\ \phantom{CH_3{-}}CH_2{-}COOR''\end{array} \quad (I')$$

In this specification, the novel product may be expressed by the Formula I and called 3-butene polycarboxylic acid ester.

In the formulae, X represents —CN, —COOR$_1$, —COR$_2$ or

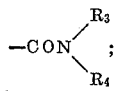

R$_1$, R' and R'' are the same or different and represent an alkyl group preferably having up to 18 carbon atoms, an alkenyl group preferably having up to 18 carbon atoms, an aryl group preferably having up to 10 carbon atoms, an aralkyl group preferably having up to 10 carbon atoms, or a cycloalkyl group preferably having 5 or 6 carbon atoms; R$_2$ represents a hydrogen atom, an alkyl group preferably having up to 6 carbon atoms or an aryl group preferably having up to 10 carbon atoms; and R$_3$ and R$_4$ are the same or different and each represents an alkyl group preferably having up to 6 carbon atoms or a phenyl group or when taken together, represent an alkylene or oxyalkylene having 4 or 5 carbon atoms.

Specific examples of the novel 3-butene polycarboxylic acid ester of the Formula I are as follows:

As the novel 3-butene-1,2,3-tricarboxylic acid esters wherein X in the formula is —COOR, the following can be mentioned:

1,2,3-trimethoxycarbonyl butene-3,
1,2,3-triethoxycarbonyl butene-3,
1,2,3-tri-n-butoxycarbonyl butene-3,
1,2-dimethoxycarbonyl-3-ethoxycarbonyl butene-3,
1,2-diethoxycarbonyl-3-methoxycarbonyl butene-3,
1,2-dicyclohexyloxycarbonyl-3-methoxycarbonyl butene-3,
1,3-dimethoxycarbonyl-2-ethoxycarbonyl butene-3,
1,2-dicyclohexyloxycarbonyl-3-ethoxycarbonyl butene-3,
1,2,3-triallyloxycarbonyl butene-3,
1,2-diallyloxycarbonyl-3-methoxycarbonyl butene-3,
1,2-diallyloxycarbonyl-3-ethoxycarbonyl butene-3,
1,2-di-n-butoxycarbonyl-3-methoxycarbonyl butene-3,
1,2-di-n-butoxycarbonyl-3-ethoxycarbonyl butene-3,
1,2-di-ethoxycarbonyl-3-n-propoxycarbonyl butene-3,
1,2-di-octyloxycarbonyl-3-methoxycarbonyl butene-3,
1,2-di-ethoxycarbonyl-3-(2-hydroxyethoxy)carbonyl butene-3,
1,2-di-methoxycarbonyl-3-phenoxycarbonyl butene-3,
1,2-diphenoxycarbonyl-3-methoxycarbonyl butene-3, and
1,2-dimethoxycarbonyl-3-stearyloxycarbonyl butene-3.

The novel 3-butene-3-cyano-1,2-dicarboxylic acid esters wherein X in the Formula I is —CN includes:

1,2-dimethoxycarbonyl-3-cyano butene-3,
1,2-diethoxycarbonyl-3-cyano butene-3,
1,2-di-n-butoxycarbonyl-3-cyano butene-3,
1,2-dicyclohexyloxycarbonyl-3-cyano butene-3,
1,2-dioctyloxycarbonyl-3-cyano butene-3, and
1,2-diphenoxycarbonyl-3-cyano butene-3.

Examples of the novel 3-butene-3-carbonyl-1,2-dicarboxylic acid esters wherein X in Formula I is —COR$_2$ are:

1,2-dimethoxycarbonyl-3-acetyl butene-3,
1,2-diethoxycarbonyl-3-acetyl butene-3,
1,2-dimethoxycarbonyl-3-formyl butene-3,
1,2-diethoxycarbonyl-3-formyl butene-3,
1,2-diallyloxycarbonyl-3-formyl butene-3,
1,2-dimethoxycarbonyl-3-benzoyl butene-3,
1,2-diallyloxycarbonyl-3-benzoyl butene-3, and
1,2-dicyclohexyloxycarbonyl-3-benzoyl butene-3.

As the novel 3-butene-3-carbamoyldicarboxylic acid esters wherein X in the formula is

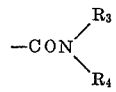

the following can be mentioned:

1,2-dimethoxycarbonyl-3-dimethylcarbamoyl butene-3,
1,2-diethoxycarbonyl-3-diethylcarbamoyl butene-3,
1,2-dimethoxycarbonyl-3-dimethylcarbamoyl butene-3,
1,2-diethoxycarbonyl-3-di-n-butylcarbamoyl butene-3,
1,2-di-n-butoxycarbonyl-3-di-n-butylcarbamoyl butene-3,
1,2-diethoxycarbonyl-3-(N-methyl-N-n-butyl)carbamoyl butene-3,
1,2-dimethoxycarbonyl-3-(N-methyl-N-n-butyl) carbamoyl butene-3, 1,2-diethoxycarbonyl-3-(N-methyl-N-phenyl)carbamoyl butene-3,
1,2-dimethoxycarbonyl-3-(N-methyl-N-phenyl) carbamoyl butene-3,
1,2-dimethoxycarbonyl-3-morpholinocarbonyl butene-3,
1,2-diethoxycarbonyl-3-morpholinocarbonyl butene-3,
1,2-dimethoxycarbonyl-3-piperidinocarbonyl butene-3,
1,2-diethoxycarbonyl-3-piperidinocarbonyl butene-3,
1,2-dicyclohexyloxycarbonyl-3-piperidinocarbonyl butene-3,
1,2-diallyloxycarbonyl-3-dimethylcarbamoyl butene-3, and
1,2-diphenoxycarbonyl-3-diethylcarbonoyl-butene-3.

Of these compounds, the first twelve compounds described as 3-butene-1,2,3-tricarboxylic acid esters, 1,2-dimethoxycarbonyl-3-formyl-butene-3 and 1,2-diethoxycarbonyl-3-formyl-butene-3 are especially preferable. Furthermore, 3-butene-1,2,3-tricarboxylic acid obtained by hydrolysis of the said carboxylic acid ester in a customary manner is also very useful.

The novel 3-butene-1,2,3-tri- or 1,2-di-carboxylic acid esters and free 3-butene-1,2,3-tricarboxylic acid of the present invention have the following utility. For instance, these compounds can be utilized as starting materials for the production of polymers. In particular, by copolymerizing the said compound with such a monomer as styrene, acrylonitrile, acrylic acid, acrylic esters, methacrylic acid, methacrylic esters and vinyl acetate, it is possible to improve the impact strength and adhesive property of a polymer of the said monomer. These compounds, when converted into their acid anhydrides, can be used as a curing agent for an epoxy resin and the like. By utilizing the tendency for easy decarbonization of these compounds, they are also useable as blowing agents. Furthermore, these compounds can be converted into butane-tricarboxylic acids and their esters by reduction according to an ordinary method. They can also be used as a chelating agent.

The novel 3-butene-polycarboxylic acid esters of the Formula I can be produced according to this invention by reacting an acrylic compound of the formula:

$$CH_2=C-X \qquad (II)$$

(wherein X has the meaning as already defined above) with a maleic acid ester of the formula:

(wherein R' and R'' have the meaning as already defined above) or a fumaric acid ester of the formula:

(wherein R' and R'' have the meaning as already defined above) in the presence of a catalytic amount of an organic tertiary phosphorus (III) compound selected from the group consisting of tertiary phosphines and tertiary phosphoamide.

The starting acrylic compounds of the Formula II are known in chemical literatures, the examples of which are as follows:
- Acryonitrile; acrolein; acrylic acid esters such as alkylesters of acrylic acid such as methyl, ethyl, propyl, n-butyl, pentyl, hexyl, octyl, nonyl, decyl, dodecyl, heptadecyl, hexadecyl and octadecyl acrylates; alkenylesters of acrylic acid such as vinyl, allyl, isopropenyl, pentenyl and hexenyl acrylate; arylesters of acrylic acid such as phenyl, tolyl, p-methoxyphenyl, p-chlorophenyl, p-bromophenyl, and naphthyl acrylate; aralkyl esters of acrylic acid such as benzyl and phenyl ethyl acrylate; and cycloalkyl esters of cyclopentyl, cyclohexyl and cycloheptyl acrylate; vinyl ketones, such as vinyl alkyl ketones such as vinyl methyl, vinyl ethyl, vinyl propyl, vinyl butyl, vinyl pentyl and vinyl hexyl ketone; and vinyl aryl ketones such as vinyl phenyl, vinyl tolyl, vinyl p-methoxy phenyl, vinyl p-chlorophenyl and vinyl naphthyl ketone; and N,N-di-substituted acrylamide such as N,N-dialkyl substituted acrylamide such as N,N-dimethyl, N,N-diethyl, N,N-dipropyl, N-methyl-N-ethyl, N,N-dibutyl, N,N-dipentyl and N,N-dihexyl acrylamide, N,N-diaryl substituted acrylamide such as N,N-diphenyl, N,N-ditolyl, N,N-di-(P-methoxy phenyl), N,N-di-(P-chloro-phenyl), N,N-dinaphthyl, N-methyl-N-phenyl, acryloyl morpholine and acryloyl piperidine.

The maleic acid esters of the Formula III and fumaric acid esters of the Formula III' to be reacted with the acrylic compound of the Formula II include the following:

The dialkyl maleates or fumarates such as dimethyl, diethyl, dipropyl, dibutyl, dipentyl, diheptyl, dioctyl, dinonyl, didnyl, didodecyl, diheptadecyl, dioctadecyl, methyl ethyl, methyl butyl, and ethyl butyl maleate or fumalate; the dialkenyl maleates or fumalates such as divinyl, diallyl, diisopropenyl, and maleates or fumalates; diaryl maleates or fumalates such as diphenyl, ditolyl, di-(P-methoxyphenyl), di-(P-chlorophenyl), phenyl-tolyl, and phenyl-P-chlorophenyl maleates or fumalates; the diaralkyl maleates or fumalates such as dibenzyl, diphenylethyl, and benzyl phenylethyl maleates or fumalates; the dicycloalkyl maleates or fumalates such as dicyclopenthyl, dicyclohexyl and cyclopentyl-cyclohexyl maleates or fumalates.

The organic tertiary phosphorus (III) compound selected from the group consisting of tertiary phosphines and tertiary phosphoamides may be expressed by the following formula:

(wherein $R_5$, $R_6$ and $R_7$ are the same or different and represent an alkyl group preferably having up to 8 carbon atoms wherein cyano, carbonyl hydroxy, hydroxycarbonyl or alkoxycarbonyl group having up to 9 carbon atoms are substituted or not substituted; a cycloalkyl group preferably having 5 to 8 carbon atoms; an aryl, preferably phenyl;

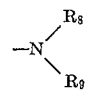

or

any two of $R_5$, $R_6$ and $R_7$ may form a hetero ring together with the phosphorus atom; $R_8$ and $R_9$ are the same or different and represent an alkyl group preferably having up to 8 carbon atoms, cycloalkyl group preferably having 5 or 6 carbon atoms, or aryl group, preferably phenyl group; $R_8$ and $R_9$ together represent an alkylene or oxyalkylene having 4 or 5 carbon atoms; $R_{10}$ and $R_{11}$ are the same or different and represent an alkyl group preferably having up to 8 carbon atoms, cycloalkyl preferably having 5 or 6 carbon atoms or an aryl group, preferably phenyl group.

Examples of the tertiary phosphines are: trialkyl phosphine such as trimethyl, triethyl, tripropyl, triisobutyl, tributyl, trihexyl and trioctylphosphine; tricycloalkyl phosphine such as tricyclopentyl, tricyclohexyl and cyclopentyl dicyclohexyl phosphine; triarylphosphine such as triphenyl phosphine, alkyl diaryl or dialkyl aryl phosphine such as isobutyl diphenyl, diisobutyl phenyl (4-hydroxy butyl diphenyl and phenyl diethylphosphine; alkyl dicycloalkyl or dialkyl cycloalkyl phosphine such as ethyl dicyclohexyl, diethyl cyclohexyl, butyl dicyclohexyl, dibutyl cyclohexyl, dicyclohexyl-2-cyanoethyl, cyclohexyl-di-(2 - cyanoethyl), dicyclohexyl - 2 - methoxycarbonylethyl, cyclohexyl-di-(2-hydroxycarbonyl) and dicyclohexyl-2-butyroyl phosphine;

tertiary phosphines such as a compound having the following formula:

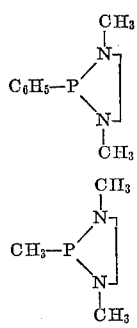

or

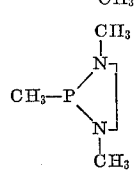

(wherein any two of $R_5$, $R_6$ and $R_7$ form a hetero ring together with a phosphorus atom).

Examples of the tertiary phosphoamides are tris(dialkylamino)phosphine such as tris(dimethylamino), tris(diethylamino), tris(diisopropylamino), tris(dibutylamino) and tris(diisobutylamino) phosphine, tris(dicycloalkylamino) phosphine such as tris(dicyclopentylamino) tris-(dicyclohexylamino) phosphine and like, tris(diarylamino) phosphine such as tris(diphenylamino), tris(ditolylamino) and tris(di-P-chlorophenylamino) phosphine, tertiary phosphoamides wherein $R_8$ and $R_9$ together form an alkylene or oxyalkylene having 4 or 5 carbon atoms such as trimorphorino, tripiperidino and tripyrrolidino phosphine, tertiary phosphoamides having different substituents such as tris(N-methyl-N-phenylamino), tris(N-methyl-N-ethylamino), tris(N-ethyl-N-cyclohexylamino), tris(N-phenyl-N-cyclohexylamino) methyl dimorpholino, ethyl dimorpholino, cyclohexyl dimorpholino, phenyl dimorpholino, ethyldipyrrolidino, cyclohexyl dipyrrolidino, phenyl dipyrrolidino and diphenyl morpholino phosphine; and tertiary phosphine wherein $R_5$, $R_6$ and $R_4$ of the Formula IV are

such as tetra cyclohexyl diphosphine, tetradiisobutyl phosphine, tetradibutyl phosphine and butyl tricyclohexyl phosphine..

Also suitable as catalysts in the process of the invention are catalysts wherein the tertiary phosphine moiety is contained within a metal complex, such as a modified metal carbonyl complex of a transition metal.

Especially preferably among the above-mentioned organic tertiary phosphorus (III) compounds are tertiary phosphines wherein a secondary carbon atom is linked with a phosphorus atom, such as tertiary phosphine having a cycloalkyl group such as tricyclopentyl phosphine, tricyclohexyl phosphine, tricycloheptyl phosphine, tris-(methylcyclohexyl)phosphine, tricycloctyl phosphine, trinorbornyl phosphine, butyl dicyclohexyl phosphine, ethyl dicyclohexyl phosphine, diethyl cyclohexyl phosphine and dibuty cyclohexyl phosphine and tertiary phosphoamides wherein $R_8$ and $R_9$ have 3 to 8 carbon atoms, such as tris(dialkylamino)phosphine such as tris(di-n-butylamino)phosphine and tris(di-isobutylamino)phosphine.

In this invention, the amount of ethylene dicarboxylic acid ester of the Formula III or III' can be determined according to the amount used in an ordinary stoichiometrical reaction, and is in general 0.1 to 5 mol equivalents, preferably 0.3 to 1.5 mole equivalents, based on the acrylic compound of the Formula I.

The reaction of this invention substantially proceeds in the presence of the organic tertiary phosphorus (III) compound of the Formula IV in a catalytic amount or in an amount of 0.0001 to 0.1 mole equivalent based on the acrylic Compound I, but does not in its absence. The amount can be increased optionally.

The reaction temperature is ordinarily 0 to 200° C., preferably 30 to 120° C.

A polymerization inhibitor such as tert.-butylpyrocatechol and pyrohydroquinone may be added to the reaction system.

It is preferable that the atmosphere of the reaction system should be nonoxidizing.

A reaction solvent is not necessarily used, but the use of a solvent which does not substantially react with the components present in the reaction system generally gives good results. Preferable examples of the inert solvent are ethers such as dimethyl and diethyl ether, dioxane, tetrahydrofuran, alcohols such as ethyl, isopropyl, tert.-butyl alcohol, sec.-butyl, sec.-amyl, tert.-amyl, octyl and decyl alcohol, aromatic hydrocarbons such as benzene, toluene and xylene, and a nitrogen-containing organic base such as dimethyl formamide, pyridine, triethyl amine and trimethyl amine.

When the reaction of this invention has sufficiently proceeded, the organic tertiary phosphorus (III) compound may be inactivated by addition to the reaction system of a catalyst-inactivating agent such as adipic acid and p-toluenesulfonic acid.

The method of this invention also includes an embodiment wherein 3-butene-1,2,3-tricarboxylic acid ester is converted to free 3 - butene - 1,2,3 - tricarboxylic acid by hydrolysis in a customary manner with an alkali such as sodium hydroxide and potassium hydroxide or an acid such as sulfuric acid. If 3-butene polycarboxylic acid ester is 3-butene-3-cyano-1,2-dicarboxylic acid ester, it can be converted into 3-butene-1,2,3-tricarboxylic acid by heating in an acid or alkali aqueous solution for hydrolysis. 3-butene-3-N-substituted carbamoyl-1,2-dicarboxylic acid ester can be converted into 3-butene-1,2,3-tricarboxylic acid by heating in an acid or alkali aqueous solution for hydrolysis.

3-butene-polycarboxylic acid ester can be converted into 3-butene-polycarboxylic acid ester having other ester group by heating in an alcohol in the presence of an ester-interchange catalyst such as sulfuric acid. 3-butene tricarboxylic acid or its esters can be converted into 3-butene polycarboxylic acid or its esters by reduction with hydrogen gas in the presence of a reducing catalyst such as nickel and palladium. These 3-butene tricarboxylic acids or their esters find wide applications as plasticizers, enamels for electric wires and water-soluble paints. If 3-butene-1,2,3-tricarboxylic acid is heated to about 200° C., it can be converted into dimethylmaleic anhydride.

EXAMPLE 1

Tricyclohexyl phosphine (0.75 g.) was added to a solution of 8.5 g. of methyl acrylate and 15.5 g. of diethyl fumarate in 45 ml. of dioxane in a stream of nitrogen, and the mixture was heated to 100° C. for 10 hours. After the addition of 0.5 g. of p-toluene sulfonic acid the solvent was removed by distillation from the reaction product mixture along with the elimination of the unreacted substance, followed by distillation by a high vacuum distillation apparatus. There was obtained 17.5 g. of 3-butene-1,2,3-tricarboxylic acid (1,2-diethyl, 3-methyl) ester having a boiling point of 101° C. at $3 \times 10^{-3}$ mm. Hg.

EXAMPLE 2

Tricyclohexyl phosphine (0.3 g.) was added to a solution of 5 g. of ethyl acrylate and 8 g. of diethyl fumarate in 30 ml. of dioxane in a nitrogen stream, and the mixture was heated for 15 hours in a water vapour bath. After recovery of the unreacted substance, the reaction product mixture was distilled by a high vacuum distillation apparatus. There was obtained 9.2 g. of 3-butene-1,2,3-tricarboxylic acid triethyl ester.

EXAMPLE 3

To a boiling solution of 0.9 g. of tricyclohexyl phosphine in 150 ml. of peroxide-free dioxane was added a mixture of 80 g. of methyl acrylate and 115 g. of dimethylmaleate in 300 ml. of purified dioxane during a period of 3 hours in an atmosphere of nitrogen. After the addition, the mixture was heated further for 2 hours. Then a solution of 0.5 g. of p-toluene sulfonic acid in 10 ml. of dioxane was added to the reaction mixture. After recovery of the unreacted substance, the reaction product mixture was distilled. There was obtained 123 g. (96% yield based on the reacted dimethylmaleate) of 3-butene-1,2,3-tricarboxylic acid trimethyl ester (B.P. 105–108° C. at 0.1 mm. Hg) along with 0.5 g. of dimethyl methyleneglutarate (B.P. 60–61° C. at 0.7 mm. Hg).

EXAMPLE 4

Tricyclohexyl phosphine (0.3 g.) was added to a solution of 4.3 g. of methyl acrylate and 7.2 g. of dimethyl fumarate in 30 ml. of dioxane in an argon stream, and the mixture was heated for 8 hours at 110° C. Distillation of the reaction product mixture gave 8.5 g. of 3-butene-1,2,3-tricarboxylic acid trimethyl ester.

The same procedures as mentioned above were repeated except that tributyl phosphine and dicyclohexyl butyl phosphine were respectively used instead of the tricyclohexyl phosphine. There were obtained 5 g. and 7.2 g. respectively of the final product.

EXAMPLE 5

A mixture of 4.3 g. of methyl acrylate, 7.7 g. of diethyl fumarate and 0.5 g. of diphenyl(4-oxybutyl)phosphine was boiled and refluxed for 10 hours in a nitrogen stream. Distillation of the reaction product mixture in a customary manner gave 5.5 g. of 3-butene-1,2,3,-tricarboxylic acid (1,2-diethyl, 3-methyl) ester.

EXAMPLES 6 TO 43

A catalyst was added to a solution in a solvent of acrylic acid ester ($CH_2=CH-COOR_1$) and fumaric acid ester (abbreviated as F) or maleic acid ester (abbreviated as M) in an atmosphere of nitrogen, and the mixture was heated to a predetermined temperature. The solvent was removed by distillation, and the unreacted substance was also removed, followed by distillation by a high vacuum distillation apparatus. Thus, 3-butene-1,2,3-tricarboxylic acid ester was obtained. The results are shown in Table I, in which, Me stands for methyl, Pr for propyl, Et for ethyl, Bu for n-butyl, 2HE for 2-hydroxyethyl, ph for phenyl, St for stearyl, and N.M.R. ($\tau$) for measured value of nuclear magnetic resonance.

EXAMPLE 44

Trimorpholino phosphine (0.4 g.) was added to a solution in 10 ml. of dioxane of 3.4 g. of methyl acrylate and 6.6 g. of diethyl fumarate in a nitrogen stream, and the mixture was heated for 16 hours at 90° C. The solvent was removed from the reaction product mixture by distillation and the unreacted substance was also removed, followed by distillation by a high vacuum distillation apparatus. There was obtained 8.5 g. of 3-butene-1,2,3-tricarboxylic acid (1,2-diethyl, 3-methyl) ester.

EXAMPLE 45

Tripyrrolidinyl phosphine (0.4 g.) was added to a solution in 10 ml. of dioxane of 4.1 g. of ethyl acrylate and 8.5 g. of diethyl fumarate in a nitrogen stream, and the mixture was heated for 20 hours at 85 to 90° C. while stirring. Distillation of the reaction product mixture gave 9.5 g. of 3-butene-1,2,3-tricarboxylic acid triethyl ester.

EXAMPLE 46

Tris(dimethylamino)phosphine (0.8 g.) was added to a solution in 20 ml. of dioxane of 8.5 g. of methyl acrylate and 15.5 g. of diethyl maleate in a stream of argon, and the mixture was heated for 20 hours at 90° C. The reaction product mixture was treated according to Example 44. There was obtained 14.5 g. of 3-butene-1,2,3-tricarboxylic acid (1,2-diethyl, 3-methyl) ester.

EXAMPLE 47

Methyldimorpholino phosphine (0.4 g.) was added to a solution in 15 ml. of dioxane of 4.3 g. of methyl acrylate and 7.2 g. of dimethyl fumarate in an argon stream, and the mixture was heated for 20 hours at 90° C. Distillation of the reaction product mixture gave 8.8 g. of 3-butene-1,2,3-tricarboxylic acid trimethyl ester.

The same reaction as above mentioned was conducted by using ethyldimorpholino phosphine or cyclohexyl dimorpholino phosphine instead of methyldimorpholino phosphine. The product was obtained at the yield of 8.2 g. or 8.9 g., respectively.

EXAMPLE 48

A mixture of 3.4 g. of methyl acrylate, 6.6 g. of diethyl fumarate and 0.4 g. of phenyldimorpholino phosphine was heated for 20 hours at 90° C. in a nitrogen atmosphere. Distillation of the reaction product mixture according to Example 44 gave 6.5 g. of 3-butene-1,2,3-tricarboxylic acid (1,2-diethyl, 3-methyl) ester.

EXAMPLE 49

Trimorpholino phosphine (0.3 g.) was added to a solution in 10 ml. of dioxane of 3.5 g. of acrylonitrile and 11 g. of diethyl fumarate in a nitrogen atmosphere, and the mixture was heated for 16 hours at 90° C. The solvent was removed by distillation and the unreacted substance was also removed, followed by distillation by a high vacuum distillation apparatus. There was obtained 10.2 g. of 3-cyanobutene-1,2-dicarboxylic acid diethyl ester.

EXAMPLE 50

Tripyrrodinyl phosphine (0.2 g.) was added to a solution in 10 ml. of dioxane of 2.7 g. of acrylonitrile and 8 g. of diethyl maleate, and the mixture was heated for 15 hours at 90° C. while stirring. The treatment of the obtained reaction product mixture according to Example 44 gave 7.2 g. of 3-cyanobutene-1,2-dicarboxylic acid dimethyl ester.

EXAMPLE 51

A solution in 25 ml. of dioxane of 5.8 g. of acrylonitrile, 14.4 g. of dimethyl fumarate and 0.8 g. of tris(dimethylamino)phosphine was heated for 15 hours at 85° C. The treatment according to Example 49 of the obtained reaction product mixture gave 13.8 g. of 3-cyanobutene-1,2-dicarboxylic acid dimethyl ester.

EXAMPLE 52

Methyldimorpholino phosphine (0.5 g.) was added to a solution in 15 ml. of dioxane of 7.5 g. of acrylonitrile and 17.5 g. of diethyl fumarate, and the mixture was heated for 20 hours at 85° C. while stirring. The treatment according to Example 49 of the obtained reaction product mixture gave 15.8 g. of 3-cyanobutene-1,2-dicarboxylic acid diethyl ester.

The same reaction as mentioned above was carried out by using ethyldimorpholino phosphine and phenyldimorpholino phosphine instead of methyldimorpholino phosphine, and the final product was obtained at the yield of 16.2 g. and 11.5 g., respectively.

EXAMPLE 53

Diphenylmorpholino phosphine (1.5 g.) was added to a solution in 10 ml. of dioxane of 3.3 g. of acrylonitrile and 8.6 g. of diethyl maleate, and the mixture was heated for 20 hours at 100° C. The treatment according to Example 49 of the obtained reaction product mixture gave 6.2 g. of 3-cyanobutene-1,2-dicarboxylic acid diethyl ester.

TABLE I

| Example | Acrylic ester (CH$_2$=CHCO$_2$R$_1$) G. | R$_1$ | Fumaric (F) or maleic (M) ester R' and R'' | F or M | G. | Solvent Name | Ml. | Catalyst Name | G. | Reaction temp. °C. | time Hr. | 3-butene-1,2,3-tricarboxylic acid ester CH$_2$=C—COOR$_1$ / HC—COOR' / CH$_2$—COOR'' R$_1$ | R' | R'' | Yield G. | B.p., °C. (Mm. Hg) | N.M.R.(τ) terminal methylene protons | |
|---|---|---|---|---|---|---|---|---|---|---|---|---|---|---|---|---|---|---|
| 6 | 3.43 | Me | Et | F | 6.64 | Dioxane | 20 | Tricyclohexyl phosphine | 0.2 | 80 | 16 | Me | Et | Et | 9.5 | 101–102 (3×10$^{-3}$) | 3.84 | 4.38 |
| 7 | 3.43 | Et | Et | F | 6.64 | do | 20 | do | 0.2 | 100 | 15 | Et | Et | Et | 6.5 | 107 (3×10$^{-3}$) | | |
| 8 | 3.43 | Me | Me | F | 6.64 | do | 20 | do | 0.2 | 100 | 16 | Me | Me | Me | 8.7 | 93–95 (1×10$^{-3}$) | 3.84 | 4.37 |
| 9 | 3.43 | Me | Me | M | 6.64 | do | 20 | Butyl methyl-2-cyanoethyl phosphine | 0.2 | 100 | 16 | Me | Me | Me | 4.8 | | | |
| 10 | 4.3 | Me | Et | F | 7.2 | do | 30 | Tributyl phosphine | 0.3 | 110 | 8 | Me | Et | Et | 5.0 | | | |
| 11 | 4.3 | Me | Et | F | 8.6 | do | 20 | do | 0.1 | 100 | 16 | Me | Et | Et | 2.9 | | | |
| 12 | 4.5 | Me | Et | F | 8.6 | do | 20 | Tri-n-octyl phosphine | 0.2 | 100 | 16 | Me | Et | Et | 2.9 | | | |
| 13 | 4.4 | Me | Et | F | 8.6 | do | 20 | Triisopropyl phosphine | 0.08 | 100 | 16 | Me | Et | Et | 2.2 | | | |
| 14 | 4.3 | Me | Et | F | 7.2 | do | 20 | Dicyclohexyl butyl phosphine | 0.3 | 110 | 8 | Me | Et | Et | 7.2 | | | |
| 15 | 4.3 | Me | Et | F | 7.7 | | | Diphenyl (4 hydroxy butyl) phosphine | 0.5 | 100 | 10 | Me | Et | Et | 5.5 | | | |
| 16 | 4.4 | Me | Et | F | 8.6 | Dioxane | 20 | Tetracyclohexyl biphosphine | 0.26 | 100 | 16 | Me | Et | Et | 1.7 | | | |
| 17 | 3.4 | Me | Et | F | 6.6 | do | 10 | Tricyclohexyl phosphine | 0.32 | 20 | 48 | Me | Et | Et | 7.6 | | | |
| 18 | 3.4 | Me | Et | F | 6.6 | Toluene / t-Butanol | 20/10 | do | 0.16 | 56 | 16 | Me | Et | Et | 8.7 | | | |
| 19 | 3.4 | Me | Et | F | 6.6 | Dioxane / t-Butanol | 10/10 | do | 0.16 | 56 | 16 | Me | Et | Et | 8.3 | | | |
| 20 | 3.4 | Me | Et | F | 6.6 | do | 10 | do | 0.16 | 56 | 16 | Me | Et | Et | 7.0 | | | |
| 21 | 3.4 | Me | Et | F | 6.6 | n-Hexane | 10 | do | 0.16 | 56 | 16 | Me | Et | Et | 6.2 | | | |
| 22 | 3.4 | Me | Et | F | 6.6 | 1,2-dimethoxyethane | 10 | do | 0.16 | 56 | 16 | Me | Et | Et | 9.1 | | | |
| 23 | 3.4 | Me | Et | F | 6.6 | Dimethyl formamide | 10 | do | 0.16 | 56 | 16 | Me | Et | Et | 9.0 | | | |
| 24 | 3.4 | Me | Et | F | 6.6 | Acetnitrile | 10 | do | 0.16 | 120 | 24 | Me | Et | Et | 7.1 | | | |
| 25 | 14.0 | Me | Et | F | 28.0 | Dioxane | 10 | do | 0.25 | 100 | 16 | Me | Et | Et | 8.0 | | | |
| 26 | 3.0 | CH$_3$ | Et,Me | M | 6.1 | do | 30 | do | 0.024 | 100 | 15 | Me | Et,Me | Allyl | 5.4 | 130(8×10$^{-3}$) | 3.89 | 4.45 |
| 27 | 4.5 | Me | Allyl | M | 8.0 | do | 30 | do | 0.8 | 100–120 | 16 | Me | Allyl | Bu | 4.9 | 139–140(1×10$^{-1}$) | 3.87 | 4.44 |
| 28 | 3.5 | Me | Bu | M | 7.5 | do | 30 | do | 0.64 | 100 | 16 | Me | Bu | Me | 9.3 | 95(8×10$^{-2}$) | 3.88 | 4.43 |
| 29 | 4.0 | Et | Me | F | 7.5 | do | 20 | do | 0.64 | 100–120 | 16 | Et | Me | Bu | 8.6 | 130–133(6×10$^{-3}$) | 3.77 | 4.33 |
| 30 | 4.0 | Et | Et | F | 7.5 | do | 30 | do | 0.64 | 100 | 16 | Et | Bu | Et | 6.4 | 115(6×10$^{-3}$) | 3.73 | 4.30 |
| 31 | 4.0 | Pr | Et | F | 6.0 | do | 30 | do | 0.64 | 100 | 16 | Pr | Et | Et | 4.4 | 108(8×10$^{-3}$) | 3.86 | 4.42 |
| 32 | 3.5 | Allyl | Allyl | F | 6.0 | do | 30 | do | 0.8 | 104–107 | 20 | Allyl | Allyl | Allyl | 1.7 | 134–136(1×10$^{-3}$) | | |
| 33 | 5.5 | Ph | Et | F | 6.0 | do | 30 | do | 0.8 | 100–105 | 23 | Ph | Et | Et | 3.45 | 140–144(1×10$^{-3}$) | 3.50 | 4.07 |
| 34 | 3.0 | Me | Cyclohexyl | F | 5.6 | do | 30 | do | 0.64 | 115 | 16 | Me | Cyclohexyl | Cyclohexyl | 6.4 | 180 (1×10$^{-3}$) | 3.90 | 4.44 |
| 35 | 5.0 | Me | Oct | M | 5.0 | do | 20 | do | 0.64 | 98–110 | 16 | Me | Oct | Et | 4.4 | 190 (1×10) | 3.88$^{-3}$ | 3.43 |
| 36 | 5.0 | Bu | Me | M | 5.6 | do | 30 | do | 0.64 | 115 | 15 | Bu | Me | Me | 6.2 | 130–31 (6×10) | 3.875$^{-3}$ | 3.43 |
| 37 | 5.0 | Bu | Et | F | 7.0 | do | 30 | do | 0.64 | 115 | 15 | Bu | Et | Et | 9.6 | 135 (1×10) | 3.9$^{-3}$ | 3.45 |
| 38 | 5.0 | Bu | Allyl | M | 8.0 | do | 30 | do | 0.64 | 115 | 15 | Bu | Allyl | Allyl | 1.5 | 140 (1×10) | 3.875$^{-3}$ | 3.43 |
| 39 | 5.0 | Bu | Bu | F | 9.2 | do | 30 | do | 0.64 | 100 | 15 | Bu | Bu | Bu | 8.6 | 160 (1×10) | 3.89$^{-3}$ | 3.45 |
| 40 | 3.0 | 2HE | Et | F | 5.6 | do | 30 | do | 0.64 | 100 | 20 | 2HE | Et | Et | 2.5 | 132 (1×10) | 3.84$^{-3}$ | 4.39 |
| 41 | 3.0 | Me | Ph | F | 4.0 | do | 30 | do | 0.4 | 100 | 15 | Me | Ph | Ph | 2.1 | 175 (1×10) | 3.70$^{-3}$ | 4.26 |
| 42 | 3.0 | St | Me | F | 6.0 | do | 30 | do | 0.8 | 100 | 15 | St | Me | Me | 5.9 | An oil | 3.89 | 4.40 |

EXAMPLE 54

Tricyclohexyl phosphine (0.65 g.) was added to a solution of 5.4 g. of acrylonitrile and 17.2 g. of diethyl fumarate in 50 ml. of dioxane, and the mixture was heated for 15 hours at 100° C. in an atmosphere of nitrogen while stirring. The obtained reaction product mixture was distilled at a reduced pressure in high vacuum. First, the unreacted diethyl fumarate was distilled out, and then 18.1 g. of 3-cyanobutene-1,2-dicarboxylic acid diethyl ester was obtained.

EXAMPLE 55

Tricyclohexyl phosphine (0.3 g.) was added to a solution in 30 ml. of dioxane of 2.7 g. of acrylonitrile and 8 g. of diethyl maleate in an atmosphere of nitrogen, and the mixture was heated for 20 hours at 100° C. The distillation of the obtained reaction product mixture gave 7.5 g. 3-cyanobutene-1,2-dicarboxylic acid diethyl ester.

EXAMPLE 56

A solution prepared by dissolving 5.8 g. of acrylonitrile, 14.4 g. of dimethyl fumarate and 0.73 g. of tricyclohexyl phosphine into 50 ml. of dioxane was heated for 20 hours while stirring in a water vapour bath. The treatment according to Example 54 of the obtained reaction product mixture gave 13.5 g. of 3-cyanobutene-1,2-dicarboxylic acid dimethyl ester.

EXAMPLE 57

One gram of diethyl phenyl phosphine was added to a mixture of 7.5 g. of acrylonitrile and 17.2 g. of diethyl fumarate, and the mixture was heated in a nitrogen stream for 20 hours at 100° C. The treatment of the obtained product mixture according to Example 54 gave 12.6 g. of 3-cyanobutene-1,2-dicarboxylic acid diethyl ester.

EXAMPLE 58

Dicyclohexylbutyl phosphine (0.9 g.) was added to a solution in 40 ml. of dioxane of 6.5 g. of acrylonitrile and 17.2 g. of diethyl maleate, and the mixture was heated for 15 hours at 90 to 100° C. in a nitrogen atmosphere. The treatment according to Example 54 gave 16.5 g. of 3-cyanobutene-1,2-dicarboxylic acid diethyl ester.

When the same reaction was carried out by using the same amount of tributyl phosphine instead of dicyclohexylbutyl phosphine, 15.5 g. of 3-cyanobutene-1,2-dicarboxylic acid diethyl ester was obtained.

EXAMPLES 59-72

A solution of a vinyl ketone derivative containing a polymerization inhibitor was added dropwise with good stirring to a solution containing fumaric acid ester (or maleic acid ester) and a catalyst in an atmosphere of nitrogen at a predetermined temperature. The reaction mixture was continuously stirred also after the completion of addition. A small amount of adipic acid was added to the obtained reaction product mixture and the solvent was removed by distillation.

The reaction product was isolated by rectification. Results are shown in Table II.

TABLE II

| | Vinyl ketone $CH_2=CHCOR_2$ | | Fumaric (F) and maleic (M) ester | | Solvent | | Catalyst | | Reaction temp. and time | | $CH_2=C-COR_2$ $CH-COOR'$ $CH_2COOR''$ | | | Yield G. | N.M.R ($\tau$) terminal methylene proton | |
|---|---|---|---|---|---|---|---|---|---|---|---|---|---|---|---|---|
| Ex. | $R_2$ | G. | R' and R'' | F or M | Name | G. | Name | G. | °C. | Hr. | $R_2$ | R' | R'' | | | |
| 59 | Me | 6 | Et | F | Dioxane | 50 | tricyclohexyl phosphine. | 0.7 | (1) | (2) | Me | Et | Et | 11.5 | 3.93 | 4.15 |
| 60 | Me | 5.2 | Me | F | do | 100 | do | 0.6 | (1) | 10 | Me | Me | Me | 13.8 | 3.92 | 4.14 |
| 61 | Me | 5.2 | Me | F | do | 100 | Tri-n-butyl phosphine. | 0.6 | (1) | 10 | Me | Me | Me | 10.5 | | |
| 62 | Me | 2.8 | Et | M | Tetrahydrofuran. | 70 | Tris(diisobutylamino) phosphine. | 0.8 | (1) | 5 | Me | Et | Et | 9.5 | | |
| 63 | Me | 2.8 | Et | M | do | 70 | Tris(di-n-butylamino) phosphine. | 0.8 | (1) | 5 | Me | Et | Et | 8.3 | | |
| 64 | Me | 2.8 | Et | M | do | 70 | Trismorpholino phosphine. | 0.8 | (1) | 5 | Me | Et | Et | 7.8 | | |
| 65 | Me | 2.8 | Et | M | do | 70 | Tris(phenyl, ethyl amino) phosphine. | 0.8 | (1) | 5 | Me | Et | Et | 7.5 | | |
| 66 | H | 3.0 | Et | F | Dioxane | 15 | Tricyclohexyl phosphine. | 0.6 | (1) | 9 | H | Et | Et | 2.5 | | |
| 67 | Ph | 6 | Et | M | Tetrahydrofuran. | 10 | do | 0.6 | (1) | 24 | Ph | Et | Et | 8.2 | | |
| 68 | Me | 3 | Et | F | do | 5 | Tributyl phosphine. | 0.6 | (1) | (2) | Me | Et | Et | 5.1 | | |
| 69 | Me | 4 | Et | F | Dioxane | 8 | Triphenyl phosphine. | 1 | 70 | 10 | Me | Et | Et | 0.3 | | |
| 70 | Me | 3 | Allyl | M | do | 8.4 | Tricyclohexyl phosphine. | 0.64 | 50 | 9 | Me | Allyl | Allyl | 6.1 | 4.03 | 4.21 |
| 71 | Me | 6.0 | Et | F | Benzene-butanol. | {80, 30} | do | 0.8 | 16-20 | 3 | Me | Et | Et | 5.0 | | |
| 72 | Me | 4.0 | Et | F | Tetrahydrofuran. | 7.0 | do | 1.2 | 0 | (3) | Me | Et | Et | 5.0 | | |

[1] Room temperature.   [2] Overnight.   [3] 17 days.

EXAMPLES 73-82

A pressure bottle charged with an acrylic amide derivative, fumaric acid ester (or maleic acid ester), a catalyst, a polymerization inhibitor and a solvent was maintained at the temperature indicated in Table III. A small amount of adipic acid was added to the obtained reaction product mixture, and the solvent was removed by distillation. The product was isolated by distilling the said mixture. The product was an isomeric mixture wherein a double bond is at the 2 and 3 positions. The results are shown in Table III, in which

represents a morpholino formed together with an adjacent nitrogen atom, and

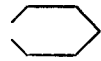

represents a piperidino formed with an adjacent nitrogen atom.

TABLE III

| Example | CH₂=CHCON(R₃)(R₄): R₃ and R₄ | G. | Fumaric (F) and maleic (M) ester: R' and R" | G. | Solvent: Name | G. | Catalyst: Name | G. | Reaction temp. °C. | and time Hr. | CH₂=C(CONR₃R₄)–CH(COOR')–CH₂–COOR": R₃ | R₄ | R' | R" | Yield G. |
|---|---|---|---|---|---|---|---|---|---|---|---|---|---|---|---|
| 73 | Et | 5.1 | Et(F) | 6.9 | Dioxane | 20 | Tricyclohexyl phosphine | 0.64 | 130 | 16 | Et | Et | Et | Et | 1.2 |
| 74 | Me | 3.95 | Et(F) | 6.9 | do | 20 | do | 0.85 | 150 | 25 | Me | Me | Et | Et | 2.8 |
| 75 | ⬡O | 5.6 | Et(M) | 6.9 | do | 20 | Tris(diisobutyl amino)phosphine | 0.84 | 180 | 16 | ⬡O | | Et | Et | 2.5 |
| 76 | ⬡O | 5.6 | Et(M) | 6.9 | do | 20 | Tris(di-n-butyl amino)phosphine | 0.84 | 180 | 16 | ⬡O | | Et | Et | 2.4 |
| 77 | ⬡O | 5.6 | Et(M) | 6.9 | do | 20 | Trismorpholino phosphine | 0.84 | 180 | 16 | ⬡O | | Et | Et | 2.1 |
| 78 | ⬡ | 4.1 | Et(M) | 5.2 | Tetrahydrofuran | 20 | Tris-n-butyl phosphine | 1.1 | 160 | 20 | ⬡ | | Et | Et | 1.5 |
| 79 | Bu | 7.3 | Me(F) | 5.7 | Dioxane | 20 | Tricyclohexyl | 1.0 | 140 | 20 | Bu | Bu | Me | Me | 2.3 |
| 80 | Bu | 7.3 | Bu(F) | 9.1 | do | 20 | do | 1.0 | 140 | 20 | Bu | Bu | Bu | Bu | 2.0 |
| 81 | CH₃, Bu | 4.9 | Et(F) | 6.9 | do | 20 | do | 1.2 | 140 | 20 | Me | Bu | Et | Et | 2.2 |
| 82 | CH₃, C₆H₅ | 5.2 | Et(F) | 6.9 | do | 20 | do | 1.2 | 140 | 20 | Me | Ph | Et | Et | 1.9 |

EXAMPLE 83

A solution in 50 ml. of water of 10 g. of potassium hydroxide and 3-butene-1,2,3-trimethylcarboxylic acid ester was refluxed for 8 hours. The reaction solution was neutralized with dilute hydrochloric acid, concentrated at reduced pressure and completely deprived of water. The obtained residual substance was extracted with ether by means of a Soxhlet's extractor. Ether was removed by distillation from the ether extracted solution. There was obtained 6.2 g. of 3-butene-1,2,3-tricarboxylic acid having a melting point of 184 to 185° C. (decomp.).

EXAMPLE 84

Four drops of concentrated sulfuric acid were added to a solution in 25 ml. of allyl alcohol of 1.0 g. of 3-butene-1,2,3-tricarboxylic acid trimethyl ester, and the mixture was refluxed for 2 days. Most of the allyl alcohol was removed by distillation from the obtained reaction product mixture. The residual liquor was neutralized with sodium hydrogencarbonate, and extracted with ether. The ether layer was washed with water, and dried with anhydrous sodium sulfate, followed by removal of ether by distillation. There was obtained 1.2 g. of 3-butene-1,2,3-tricarboxylic acid triallyl ester.

EXAMPLE 85

A round-bottomed flask charged with 2.0 g. of 3-butene-1,2,3-tricarboxylic acid was heated to 220 to 230° C. over an oil bath in a nitrogen stream. The said tricarboxylic acid was molten and foaming occurred. When the foaming ended, the heating was stopped and the said round-bottomed flask was cooled. There was obtained 1.3 g. of dimethyl maleic anhydride having a melting point of 96° C.

EXAMPLE 86

A reaction mixture prepared by adding rhodium oxide (RhO₂) to a solution in 40 ml. of methanol of 20 g. of 3-butene-1,2,3-tricarboxylic acid trimethyl ester was maintained at room temperature for 20 hours in an autoclave with a hydrogen pressure of 80 kg./cm.². RhO₂ was removed from the obtained reaction product mixture by a centrifugal separator, and the methanol was removed by distillation. The residue was distilled and 20.4 g. of butene-1,2,3-tricarboxylic acid trimethyl ester (B.P. 118 to 120° C. at 0.8 mm. Hg) was obtained.

EXAMPLE 87

A solution in 200 ml. of water of 15.4 g. of butane-1,2,3-tricarboxylic acid trimethyl ester and 15 g. of potassium hydroxide was refluxed for 10 hours in a nitrogen stream. The obtained reaction product mixture was acidified with a 5% hydrochloric acid. Water was then removed from the said mixture by distillation under reduced pressure. The precipitation residue was refluxed and extracted for 30 minutes with acetone, and the acetone solution was filtered. Acetone was removed from the filtrate by distillation under reduced pressure. There was obtained 5.7 g. of butene-1,2,3-tricarboxylic acid (recrystallized from acetone; M.P. 180–181° C.).

Butene-1,2,3-tricarboxylic acid and its esters are widely used as plasticizer, enamel for electric wires and water-soluble paints, etc.

What is claimed is:

1. A butene polycarboxylic acid ester of the formula $$CH_2=C-COOR_1$$
$$|$$
$$CH-COOR'$$
$$|$$
$$CH_2-COOR''$$

wherein $R_1$, $R'$ and $R''$ are the same or different and represent an alkyl group having up to 18 carbon atoms, an alkenyl group having up to 18 carbon atoms, an aryl group having up to 10 carbon atoms, an aralkyl group having up to 10 carbon atoms or a cycloalkyl group having 5 or 6 carbon atoms.

2. 3-butene-1,2,3-tricarboxylic acid.
3. 1,2,3-trimethoxycarbonyl butene-3.
4. 1,2,3-triethoxycarbonyl butene-3.
5. 1,2,3-tri-n-butoxycarbonyl butene-3.
6. 1,2-dimethoxycarbonyl-3-ethoxycarbonyl butene-3.
7. 1,2-diethoxycarbonyl-3-methoxycarbonyl butene-3.
8. 1,3-dimethoxycarbonyl-2-ethoxycarbonyl butene-3.
9. 1,2-dicyclohexyloxycarbonyl - 3 - methoxycarbonyl butene-3.
10. 1,2-dicyclohexyloxycarbonyl - 3 - ethoxycarbonyl butene-3.
11. 1,2,3-triallyloxycarbonyl butene-3.
12. 1,2-diallyloxycarbonyl - 3 - methoxycarbonyl butene-3.

13. 1,2-diallyloxycarbonyl-3-ethoxycarbonyl butene-3.

References Cited

UNITED STATES PATENTS 3,074,999   1/1963   Rauhut et al. _____ 260—485
3,342,853   9/1967   Nemec _____ 260—485

LORRAINE A. WEINBERGER, Primary Examiner
E. J. SKELLY, Assistant Examiner

U.S. Cl. X.R.

260—85.5, 86.1, 247.2, 294.3, 465.4, 471, 475, 479, 482, 483, 537